(12) United States Patent
Leu et al.

(10) Patent No.: US 7,014,351 B2
(45) Date of Patent: Mar. 21, 2006

(54) PLANAR SURFACE ILLUMINATOR

(75) Inventors: Charles Leu, Fremont, CA (US);
Ga-Lane Chen, Fremont, CA (US)

(73) Assignee: Hon Hai Precision Ind. Co. Ltd.,
Taipei Hsien (TW)

( * ) Notice: Subject to any disclaimer, the term of this patent is extended or adjusted under 35 U.S.C. 154(b) by 72 days.

(21) Appl. No.: 10/658,961

(22) Filed: Sep. 8, 2003

(65) Prior Publication Data

US 2004/0125591 A1   Jul. 1, 2004

(30) Foreign Application Priority Data

Dec. 25, 2002   (TW)   ............................... 91137240 A

(51) Int. Cl.
*F21V 8/00* (2006.01)

(52) U.S. Cl. ....................... 362/625; 362/629; 362/619
(58) Field of Classification Search .................. 362/27, 362/31, 84, 260, 561, 582, 231, 623, 624, 362/625; 349/65, 71; 40/542
See application file for complete search history.

(56) References Cited

U.S. PATENT DOCUMENTS

| | | |
|---|---|---|
| 5,886,759 A | 3/1999 | Mashino et al. |
| 6,196,691 B1 | 3/2001 | Ochiai |
| 6,445,504 B1 * | 9/2002 | Suga et al. .................. 359/599 |
| 6,700,634 B1 * | 3/2004 | Taniguchi et al. ............ 349/65 |
| 2003/0214718 A1 * | 11/2003 | Kaminsky et al. .......... 359/599 |

FOREIGN PATENT DOCUMENTS

JP   06235823 A   *   8/1994

* cited by examiner

*Primary Examiner*—Sandra O'Shea
*Assistant Examiner*—Guiyoung Lee
(74) *Attorney, Agent, or Firm*—Wei Te Chung

(57) ABSTRACT

A planar surface illuminator (20) for installation below a liquid crystal display panel includes a light guide plate (22) and a plurality of light emitting diodes (21). The light guide plate has a bottom surface (223), an end surface (221) and a number of dots (23) formed on the bottom surface. The light emitting diodes are positioned adjacent the end surface to irradiate the light guide plate. Shortfall areas (223a) in the light guide plate between each two adjacent light emitting diodes are lightened by placing special dots (23a) therein, which special dots are made of melamine-based fluorescent particles. The melamine-based fluorescent particles function as small light sources, thus lightening the shortfall areas. The brightness of the planar surface illuminator is thereby balanced.

16 Claims, 3 Drawing Sheets

PLANAR SURFACE ILLUMINATOR

BACKGROUND OF THE INVENTION

1. Field of the Invention

The present invention relates to a planar surface illuminator, and especially to a planar surface illuminator using point light sources and provided below a liquid crystal display (LCD) panel.

2. Description of the Related Art

Most users expect displays in portable devices, such as laptop and notebook computers, mobile phones and game devices, to have large, clear, bright viewing screens, equaling the performance of the cathode-ray-tube (CRT) monitors sitting on their desks. LCDs are one type of flat panel display (FPD) which satisfies these expectations. However because liquid crystals are not self-luminescent, LCDs need a planar surface illuminator which offers sufficient luminance (brightness) in a planar surface. Typically, planar surface illuminators have one of two types of light sources, one being linear sources, such as a cold cathode fluorescent lamp (CCFL), and the other being point sources, such as a light emitting diode (LED). Different types of light sources require different planar surface illuminator design structures.

As shown in FIG. 5, a conventional planar surface illuminator 10 which uses point light sources comprises a light guide plate 15 and three point sources 13 positioned at one side of the light guide plate 15. The light guide plate 15 couples with light beams emitted from the point sources 13 to create a planar surface illuminator for irradiating a liquid crystal panel (not shown). The point sources 13 are LEDs, each of which has an emission beam known as a Gaussian beam. The Gaussian beam has an optical intensity distribution function shaped like a Gaussian curve.

In operation, the Gaussian beams from the LEDs 13 irradiate an end surface (not labeled) of the light guide plate 15, and may transmit in the light guide plate 15 or may be emitted out of the light guide plate 15 through an output surface (not labeled), which is perpendicular to the end surface. As seen in FIG. 5, lower intensity parts of the Gaussian beams illuminate the areas D, E, F, G between and adjacent each two LEDs 13. In some areas near the midpoint between each two LEDs 13, almost no beams are emitted out of the light guide plate 15. Darkened areas are formed near points D, E, F, and G. Therefore, the planar surface illuminator 10 cannot produce uniform brightness over an entire area of the liquid crystal display panel.

SUMMARY OF THE INVENTION

Accordingly, an object of the present invention is to provide a planar surface illuminator which provides more highly uniform brightness to a liquid crystal display panel.

Another object of the present invention is to provide a planar surface illuminator which more efficiently utilizes the light energy of point light sources.

To achieve the above objects, a planar surface illuminator for placement below a liquid crystal display panel comprises a light guide plate and a plurality of point light sources. The light guide plate has a bottom surface, an end surface, and a number of dot patterns dots formed on the bottom surface. The point light sources are positioned at the end surface to irradiate the light guide plate. Darkened areas between the point light sources are lightened by placing special dots therein, which special dots are made of melamine-based fluorescent particles. The melamine-based fluorescent particles function as many small light sources, thus lightening the darkened areas. The brightness of the planar surface illuminator is thereby balanced and made more uniform.

Other objects, advantages and novel features of the present invention will be apparent from the following detailed description of preferred embodiments thereof with reference to the attached drawings, in which:

DETAILED DESCRIPTION OF THE PREFERRED EMBODIMENTS

Figure 1:
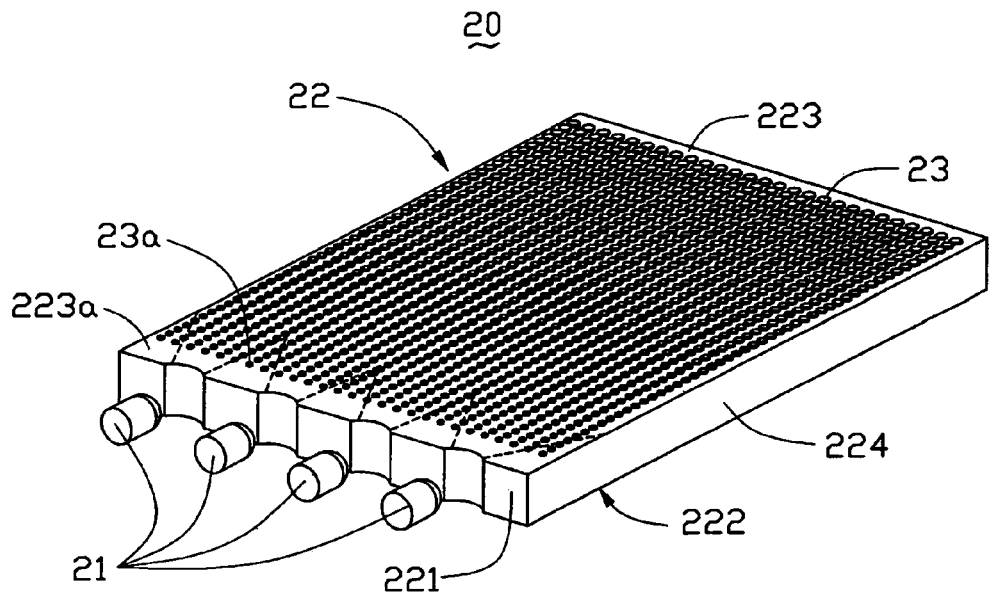
FIG. 1 is a perspective view of a planar surface illuminator constructed in accordance with a preferred embodiment of the present invention from a bottom-side aspect.

Referring to FIG. 1, a planar surface illuminator 20 for installation below a liquid crystal display panel (not shown) comprises an optical light guide plate 22 and a plurality of point light sources 21. The point light sources 21 are positioned to a side of the optical light guide plate 22. Light from the point light sources 21 couples with an optical input surface 221 of the optical light guide plate 22.

Figure 5:
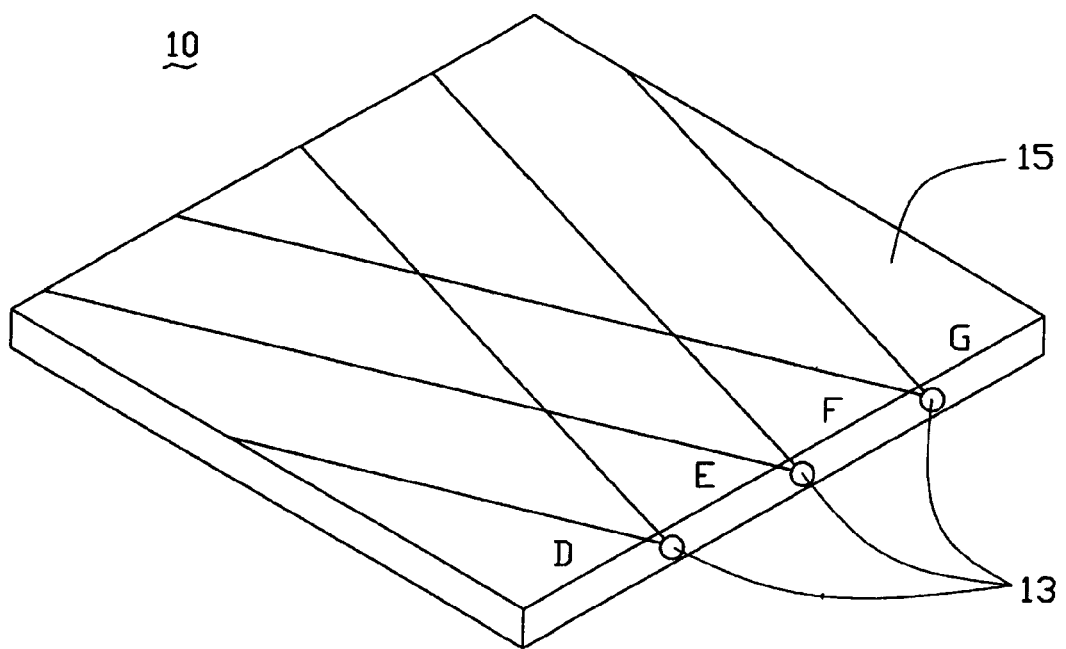
FIG. 5 is a perspective view of a conventional planar surface illuminator.

Similar to the point sources 12 shown in FIG. 5 with regard to the conventional planar surface illuminator 10, the point light sources 21 in FIG. 1 are LEDs, each of which has an emission beam in the form of a Gaussian beam. The Gaussian beam has an optical intensity distribution function shaped like a Gaussian curve. In operation, the Gaussian beams from the LEDs 21 irradiate the input surface 221 of the light guide plate 22, and may transmit in the light guide plate 22, or may be emitted out of the light guide plate 22 from an output surface 222 which is perpendicular to the input surface 221. Absent any corrective structure, the result would be formation of darkened areas 223a adjacent and in between each two LEDs 21.

The optical light guide plate 22 is shaped substantially as a rectangular plane sheet and comprises the optical input surface 221 adjacent to the point light sources 21, the optical output surface 222, a bottom surface 223, and three side surfaces 224. The input surface 221 defines grooves (not labeled) corresponding to each point light source 21. Alternatively, the optical light guide plate 22 can be substantially shaped as a wedge. To improve optical performance efficiency, reflective sheets or films (not shown) can be secured on the bottom surface 223 and the three side surfaces 224. The use of the reflective sheets or films ensures that virtually all the optical light beams from the light sources 21 are eventually emitted from the optical output surface 222.

Figure 2:
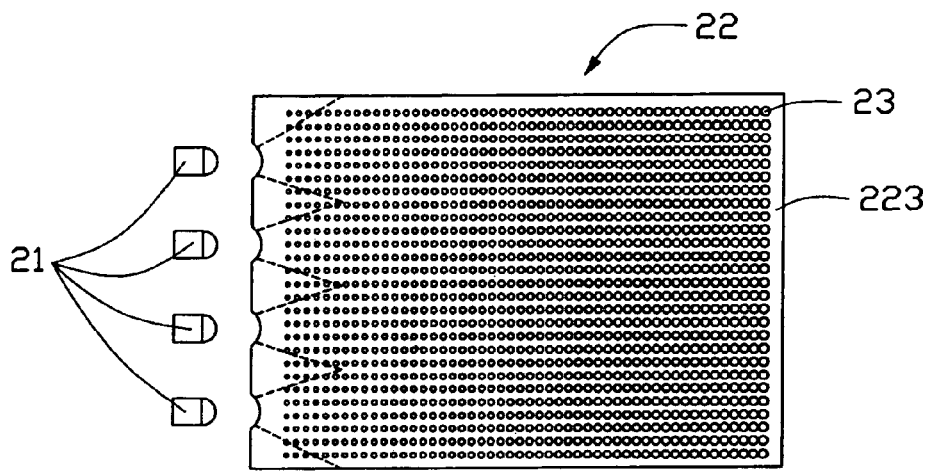
FIG. 2 is a bottom plan view of FIG. 1.
Figure 3:
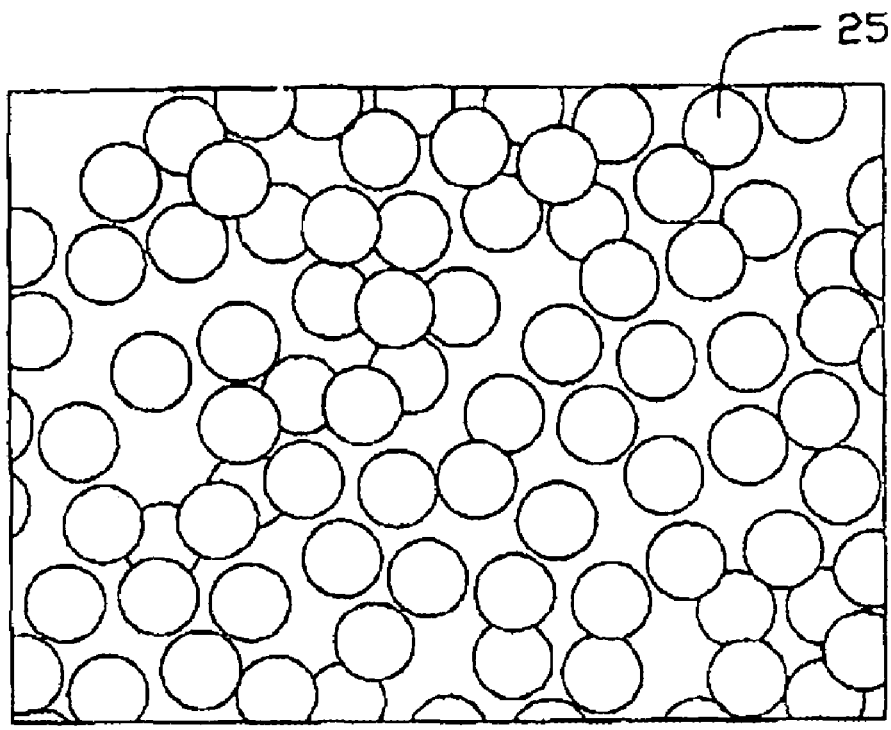
FIG. 3 is a greatly magnified view of a small portion of a special dot for use in darkened areas of FIG. 2.

Referring also to FIGS. 2 and 3, a number of reflective dots 23 are formed on or applied to the bottom surface 223 in a uniform pattern to promote uniform emission of light from the optical output surface 222. Note that the dots 23 are all of a same size in a same column, but increase in size in a same row as a distance away from the optical input surface 221 increases. The dots 23 are injection molded or printed on the bottom surface 223. To balance lack of illumination emitted from the darkened areas 223a and thereby to provide an even brightness to the liquid crystal display panel, some special dots 23a positioned in the darkened areas 223a are made of melamine-based fluorescent particles 25 (see FIG. 3). The dots 23a constitute the corrective structures referred to above. Diameters of the melamine-based fluorescent particles 25 are in a range of from 1 to 10 microns, so as to correspond to different emission wavelengths of the LEDs 21. Each melamine-based fluorescent particle 25 can be a mixture or one of green, red and orange fluorescent dyes polymerized with melamine particles. Excitation and emission wavelengths of the green fluorescent dyes are respectively about 506 and 529 nanometers, excitation and emission wavelengths of the red fluorescent dyes are respectively about 636 and 686 nanometers, and excitation and emission wavelengths of the orange fluorescent dyes are respectively about 560 and 584 nanometers.

In operation, when exited by light beams from the LEDs 21, the melamine-based fluorescent particles 25 function as many small light sources lighting the darkened areas 223a, and so the brightness of the planar surface illuminator 20 is balanced. Furthermore, light beams from the melamine-based fluorescent particles 25 do not lighten the darkened areas 223a only. The light beams also transmit into or out of other areas of the light guide plate 22, so that the optical energy of the LEDs 21 is adequately utilized. The total brightness, therefore, is also increased.

Figure 4:
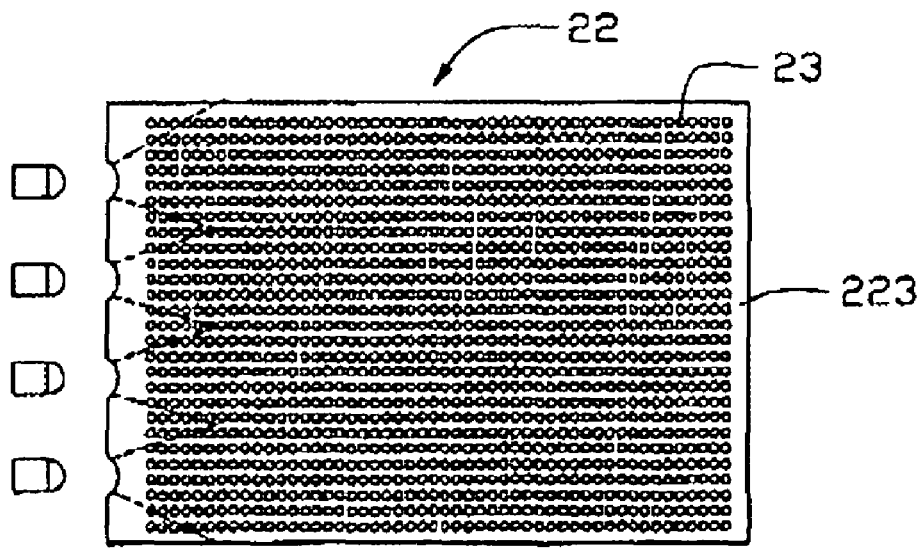
FIG. 4 is a bottom plan view of a planar surface illuminator constructed in accordance with a second preferred embodiment of the present invention.

Turning to FIG. 4, the dots 23 also can be uniformly spaced on the bottom surface 223, with all the dots 23 being of the same size. The special dots 23a in the darkened areas 223a are not made of melamine-based fluorescent particles 25, it but are instead just coated with melamine-based fluorescent particles. This structure can also provide even brightness to the liquid crystal display panel.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A planar surface illuminator for use beneath a liquid crystal display panel, comprising:
  a light guide plate comprising a bottom surface;
  a plurality of light emitting diodes emitting Gaussian light irradiating the light guide plate, and defining shortfall areas in the light guide plate between each two adjacent light emitting diodes; and
  a plurality of dots formed on the bottom surface, wherein at least some of the dots positioned at the shortfall areas are made of melamine-based fluorescent particles and function as small light sources lighting the shortfall areas.

2. The planar surface illuminator as described in claim 1, wherein the melamine-based fluorescent particles are polymerized with green fluorescent dye and melamine particles.

3. The planar surface illuminator as described in claim 2, wherein excitation and emission wavelengths of the green fluorescent dye are respectively about 506 and 529 nanometers.

4. The planar surface illuminator as described in claim 1, wherein the melamine-based fluorescent particles are polymerized with red fluorescent dye and melamine particles.

5. The planar surface illuminator as described in claim 4, wherein excitation and emission wavelengths of the red fluorescent dye are respectively about 636 and 686 nanometers.

6. The planar surface illuminator as described in claim 1, wherein the melamine-based fluorescent particles are polymerized with orange fluorescent dye and melamine particles.

7. The planar surface illuminator as described in claim 6, wherein excitation and emission wavelengths of the orange fluorescent dye are respectively about 560 and 584 nanometers.

8. The planar surface illuminator as described in claim 1, wherein each melamine-based fluorescent particle is a mixture of green, red and orange fluorescent dyes polymerized with melamine particles.

9. The planar surface illuminator as described in claim 1, wherein diameters of the melamine-based fluorescent particles are in a range of from 1 to 10 microns.

10. The planar surface illuminator as described in claim 1, wherein the dots are uniformly spaced apart on the bottom surface.

11. The planar surface illuminator as described in claim 1, wherein the dots increase in size with increasing distance away from the point light sources.

12. A planar surface illuminator for use beneath a liquid crystal display panel, comprising:
  a light guide plate comprising a bottom surface;
  a plurality of light emitting diodes emitting Gaussian light irradiating the light guide plate, and defining shortfall areas in the light guide plate between each two adjacent light emitting diodes; and
  a plurality of dots formed on the bottom surface, wherein at least some of the dots are coated with melamine-based fluorescent particles and are positioned at the shortfall areas, and function as small light sources lighting the shortfall areas, for providing even brightness to the liquid crystal display panel.

13. The planar surface illuminator as described in claim 12, wherein the melamine-based fluorescent particles are polymerized with green fluorescent dye and melamine particles, and excitation and emission wavelengths of the green fluorescent dye are respectively about 506 and 529 nanometers.

14. The planar surface illuminator as described in claim 12, wherein the melamine-based fluorescent particles are polymerized with red fluorescent dye and melamine particles, and excitation and emission wavelengths of the red fluorescent dye are respectively about 636 and 686 nanometers.

15. The planar surface illuminator as described in claim 12, wherein the melamine-based fluorescent particles are polymerized with orange fluorescent dye and melamine particles, and excitation and emission wavelengths of the orange fluorescent dye are respectively about 560 and 584 nanometers.

16. The planar surface illuminator as described in claim 12, wherein each melamine-based fluorescent particle is a mixture of green, red and orange fluorescent dyes polymerized with melamine particles.

* * * * *